(12) United States Patent
Handke et al.

(10) Patent No.: US 8,109,491 B2
(45) Date of Patent: Feb. 7, 2012

(54) VIBRATION DAMPER WITH A STOP SPRING

(75) Inventors: Günther Handke, Euerbach (DE); Hans Gonschorrek, Bergrheinfeld (DE)

(73) Assignee: ZF Friedrichshafen, Friedrichshafen (DE)

( * ) Notice: Subject to any disclaimer, the term of this patent is extended or adjusted under 35 U.S.C. 154(b) by 1053 days.

(21) Appl. No.: 11/639,924

(22) Filed: Dec. 15, 2006

(65) Prior Publication Data

US 2007/0138721 A1    Jun. 21, 2007

(30) Foreign Application Priority Data

Dec. 21, 2005   (DE) .......................... 10 2005 061 164

(51) Int. Cl.
*F16F 9/00*   (2006.01)
(52) U.S. Cl. .................. 267/220; 188/266; 188/322.18; 188/322.17; 188/322.15; 188/283; 92/165 R; 92/166; 92/168
(58) Field of Classification Search .................. 188/266, 188/322.18, 322.17, 322.15, 282.9, 283; 267/220; 92/165 R, 166, 168
See application file for complete search history.

(56) References Cited

U.S. PATENT DOCUMENTS

| | | | | |
|---|---|---|---|---|
| 2,981,534 A * | 4/1961 | Peras | ........................... | 267/220 |
| 4,004,662 A * | 1/1977 | Sorgatz et al. | ................ | 188/284 |
| 4,287,970 A * | 9/1981 | Eusemann et al. | ............ | 188/269 |
| 4,418,802 A * | 12/1983 | Fukushima et al. | ........ | 188/283.1 |
| 4,527,674 A * | 7/1985 | Mourray | ........................ | 188/284 |
| 5,024,301 A * | 6/1991 | Cook | ............................ | 188/284 |
| 5,224,573 A * | 7/1993 | Amemiya et al. | ........ | 188/322.17 |
| 5,280,890 A * | 1/1994 | Wydra | ........................... | 267/220 |
| 5,531,299 A * | 7/1996 | Bataille | ..................... | 188/322.17 |
| 5,896,960 A * | 4/1999 | Ananthanarayanan | .. | 188/321.11 |
| 6,102,170 A * | 8/2000 | de Molina et al. | ............ | 188/275 |
| 6,186,486 B1 * | 2/2001 | Gutman et al. | ................ | 267/220 |
| 6,220,406 B1 * | 4/2001 | de Molina et al. | ............ | 188/275 |
| 7,004,292 B2 * | 2/2006 | Schilz | ........................... | 188/276 |
| 2002/0027051 A1 * | 3/2002 | Grundei | ................... | 188/322.15 |
| 2006/0191755 A1 * | 8/2006 | Fritz et al. | ..................... | 188/266 |

FOREIGN PATENT DOCUMENTS

| | | |
|---|---|---|
| DE | 78 02 898 | 8/1978 |
| DE | 78 37 029 | 4/1979 |
| DE | 29 05 928 | 8/1980 |
| DE | 10 2004 007 960 | 9/2005 |
| EP | 0 120 005 | 10/1984 |
| JP | 2002039252 | 2/2002 |

\* cited by examiner

*Primary Examiner* — Robert Siconolfi
*Assistant Examiner* — James Hsiao
(74) *Attorney, Agent, or Firm* — Cozen O'Connor

(57) ABSTRACT

A vibration damper, comprising a damping medium-filled cylinder, in which a piston rod is guided with freedom of axial movement, where, inside a working space in the cylinder, a stop spring in the form of a circular ring is located, which, after the piston rod has reached a defined stroke position, is compressed between a stop surface on the piston rod side and an end surface forming an axial boundary of the working space, and where the stop spring also forms a boundary of a radially inner space, which is connected to the working space outside the stop spring by means of at least one radial channel. The stop surface on the piston rod side and/or the axially limiting end surface is formed by a rigid body and is provided with at least one radial channel, which extends from the radially inner space to the radially outer working space, "inner" and "outer" being defined with respect to the stop spring.

4 Claims, 6 Drawing Sheets

VIBRATION DAMPER WITH A STOP SPRING

BACKGROUND OF THE INVENTION

1. Field of the Invention

The present invention relates to a vibration damper having a piston cylinder with a cylinder, a piston connected to a piston rod axially movably arranged in the cylinder, and a stop spring which is compressed after a piston rod of the vibration damper reaches a defined stroke position and which defines a radially inner space connected to a working space in said cylinder.

2. Description of the Related Art

DE 78 02 898 U1 discloses a vibration damper with a stop spring in the form of a circular elastomeric ring, which is concentric to a piston rod inside a damping medium-filled working space on the piston rod side of the vibration damper. As soon as a defined stroke position is reached, the stop spring is clamped by a stop on the piston rod side against an end surface of a piston rod guide facing the working space. When the stop spring is compressed, the volume of the damping medium present in the annular space between the piston rod and the stop spring is pushed radially outward through transverse openings. These transverse openings, however, are also axially clamped, and their cross section is thus reduced. To ensure that damping medium can continue to escape from the annular space, the stop spring has radial channels in its end surfaces; these channels connect the annular space to the working space on the piston rod side. At an increased level of compression, however, these radial channels can also be closed by the displacement or deformation of the entire stop spring. Thus the damping medium can escape from the annular space only in the direction toward the piston rod guide. Experiments have shown that this effect does not lead to any damage in the case of a vibration damper of the two-tube type. Two-tube vibration dampers such as those known from U.S. Pat. No. 4,287,970 have a side channel between a piston rod bush and a piston rod seal. Oil carried along on the piston rod can escape through this side channel to a compensating space. This side channel can then also be used by the damping medium to escape from the annular space of the stop spring. This possibility is not available in a vibration damper of the single-tube type, the compensating space of which is frequently located downstream from the working space on the side of the piston facing away from the piston rod. Under certain conditions, therefore, damping medium can emerge in the gap between the stop spring and the piston rod. It has also been found that the previously described problem occurs primarily in the case of comparatively long stop springs. The use of short stop springs, however, does not represent a genuine solution, because it is necessary to maintain a specific damping force characteristic.

A stop spring with a closed, ring-shaped body as a spring element and metal angular rings at one end, which slide on the piston rod, is known from U.S. Pat. No. 4,527,674. These angular rings have short webs on the axial end surfaces, so that radial discharge channels are present when the end surface rests against, for example, the piston rod guide. The discharge channels are guaranteed to remain open. The metal angular rings, however generate noise when they strike the piston rod guide, and this interferes with passenger comfort.

SUMMARY OF THE INVENTION

An object of the present invention is to provide a vibration damper with a stop spring such that an escape from the annular space between the piston rod and the stop spring is ensured.

The object is met according to an embodiment of the invention in that a stop surface on a piston rod side and/or the axially limiting end surface is formed by a rigid body and is provided with at least one radial channel which extends from the radially inner space to the radially outer working space, "inner" and "outer" being defined with respect to the stop spring.

An advantage of this embodiment is that, regardless of what conditions may prevail, a connection will always be present between the inner space and the outer working space, so that the damping medium will be able to escape from the inner space. Because the stop spring does not have solid end pieces, no contact noises are generated.

Especially in the case of a vibration damper designed according to the single-tube principle, it is provided that a piston rod guide forming one of the boundaries of the working space comprises a support disk facing the working space, the radial channel being formed in this disk.

The radial channel is preferably produced by a stamping operation, so that a low-cost manufacturing method can be used, which eliminates the danger that machining burrs could be formed, which could damage the stop spring.

According to a further embodiment, the radial channel extends outward from the inner diameter of the stop surface in a direction that has both a radial and circumferential component.

Especially when the stop spring has at least one discharge groove in one end, it is possible for the discharge groove in the stop spring and the radial channel in the stop surface to overlap at least partially in the installed position of the stop spring, which further improves the flow conditions between working spaces inside and outside of the stop spring.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is to be explained in greater detail below on the basis of the following description of the figures, in which.

DETAILED DESCRIPTION OF THE PRESENTLY PREFERRED EMBODIMENTS

Figure 1:
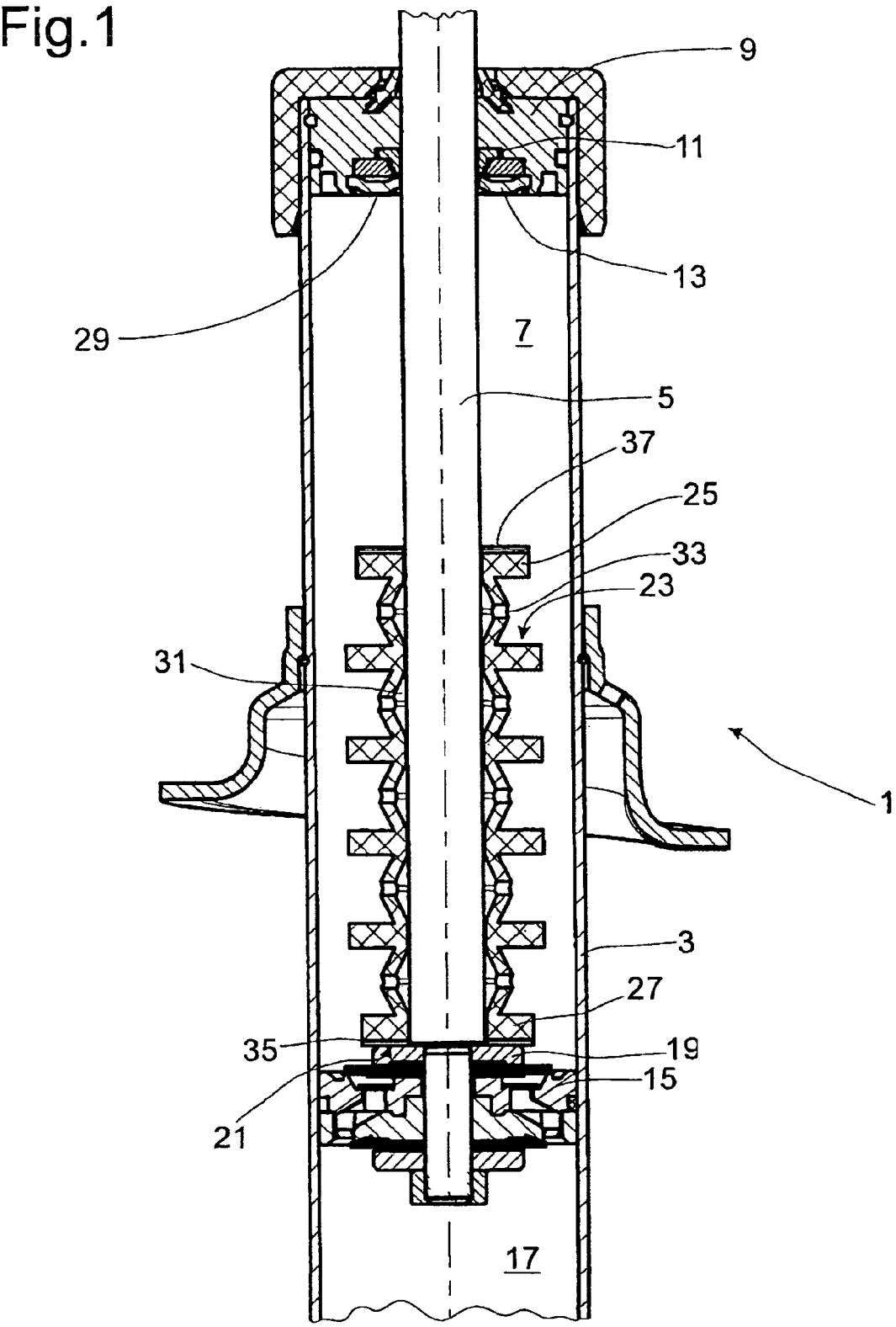
FIG. 1 is a longitudinal sectional view of a portion of a vibration damper of the single-tube type according to an embodiment of the present invention.

FIG. 1 shows a vibration damper 1 of the single-tube type with a cylinder 3, in which a piston rod 5 is guided with freedom of axial movement. A working space 7 at one end of the cylinder 3 is closed by a piston rod guide 9 and completely filled with a damping medium, preferably oil. The piston rod guide 9 is equipped with a piston rod seal 11 which is secured axially by a support disk 13.

A piston 15 separates the working space 7 on the piston rod side from a working space 17 on the side opposite the piston rod and is attached to the piston rod 5. The piston 15 comprises a support disk 19 with a stop surface 21 for an axially floating stop spring 23 which is in the form of a circular ring formed by an elastomeric body. The elastomeric body forming the stop spring 23 has terminal rings 25, 27 at respective ends thereof. Depending on the stroke position of the piston rod, one of the terminal rings 25, 27 comes to rest against the stop surface 21 of the support disk 19 or against a stop surface 29 of the support disk 13.

An annular space 31 is defined between the circular ring-shaped elastomeric body of the stop spring 23 and the piston rod 5. The annular space 31 is connected to the working space 7 by a number of transverse openings 33. Discharge grooves 35, 37, furthermore, are also provided in the terminal rings 25, 27. These grooves extend from a through-opening at the piston rod 5 to the outer edge (see also FIG. 4).

In principle, a stop spring of this type can also be installed in the working space 17 on the side opposite the piston rod, between the piston 15 and a sealing element (not shown) of the working space 17.

Figure 2:
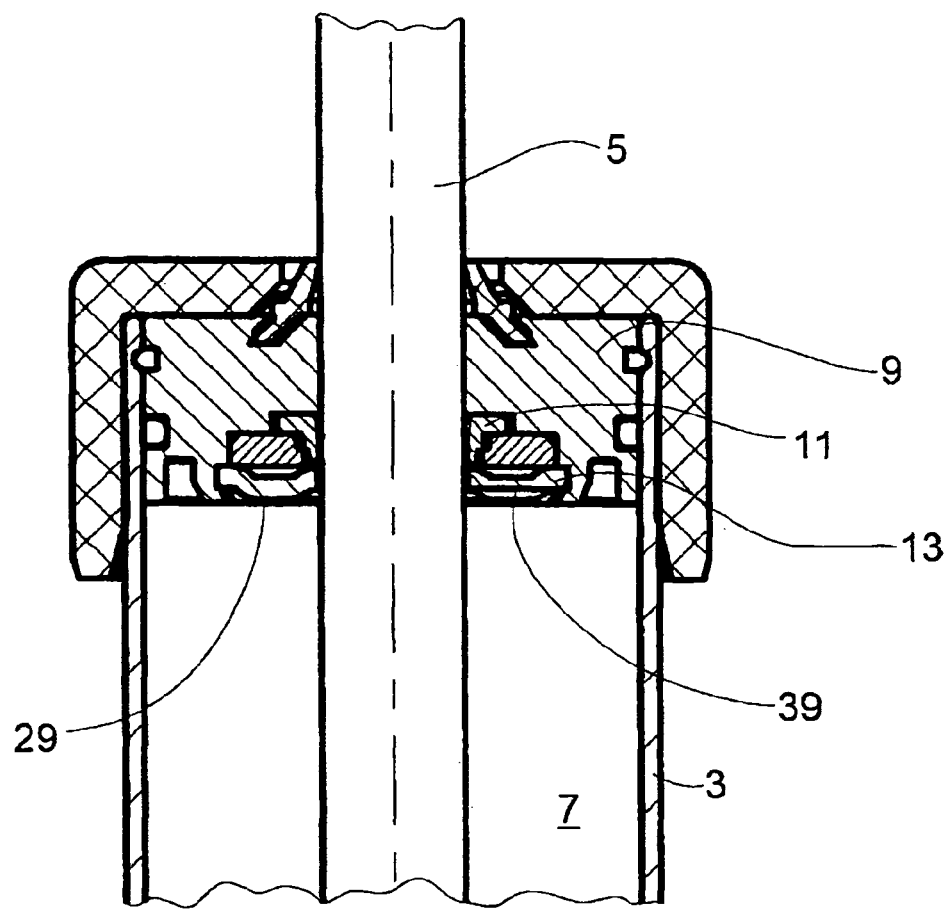
FIG. 2 is a sectional view of a detailed area of the piston rod guide of the vibration damper of FIG. 1.

FIG. 2 shows the area of the piston rod guide according to FIG. 1. In the stop surface 29 of the rigid support disk 13 on the piston rod side, at least one radial channel 39 is formed, which extends from the radially inner space 31 (FIG. 1) to the radially outer working space 7, the terms "inner" and "outer" being defined with respect to the stop spring 23. When the stop spring 23 contacts the support disk 13, the radial channel 39 remains open even if the discharge groove 37 (FIG. 1) is blocked by deformation of the terminal ring 25, which can happen under certain conditions as the result of increased compression and the associated change in the shape.

Figure 3:
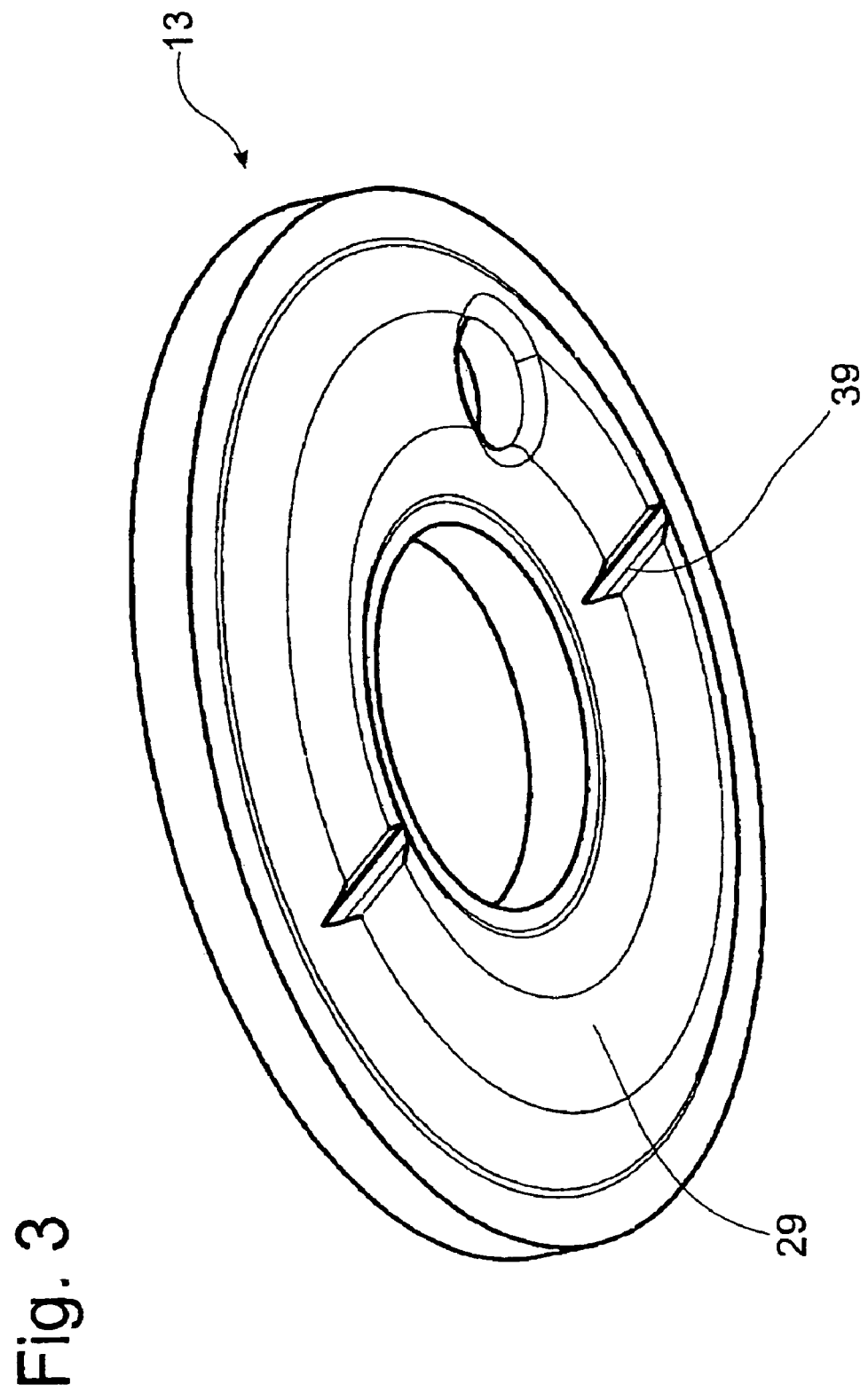
FIG. 3 is a perspective view of the support disk of FIG. 2.

It can be seen from FIG. 3 that the radial channels 39 are designed as simple notches, which can be produced by a stamping operation.

Figure 4:
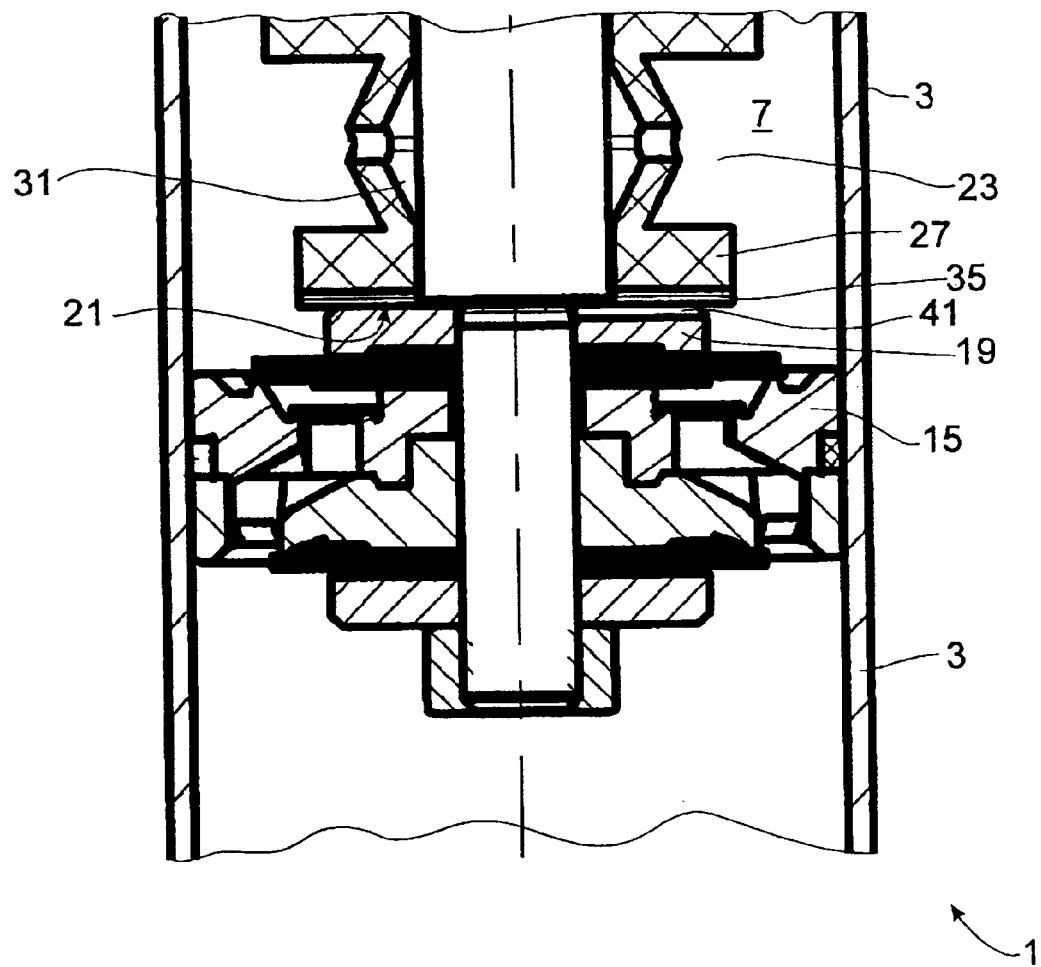
FIG. 4 is a sectional view of the area of a stop surface on the piston rod side of the vibration damper of FIG. 1.

FIG. 4 shows the vibration damper 1 in the area of the piston 15. The support disk 19 also has radial channels 41 facing the terminal ring 27 of the stop spring 23 to allow the escape of damping medium from the radially inner annular space 31 to the working space 7.

Figure 5:
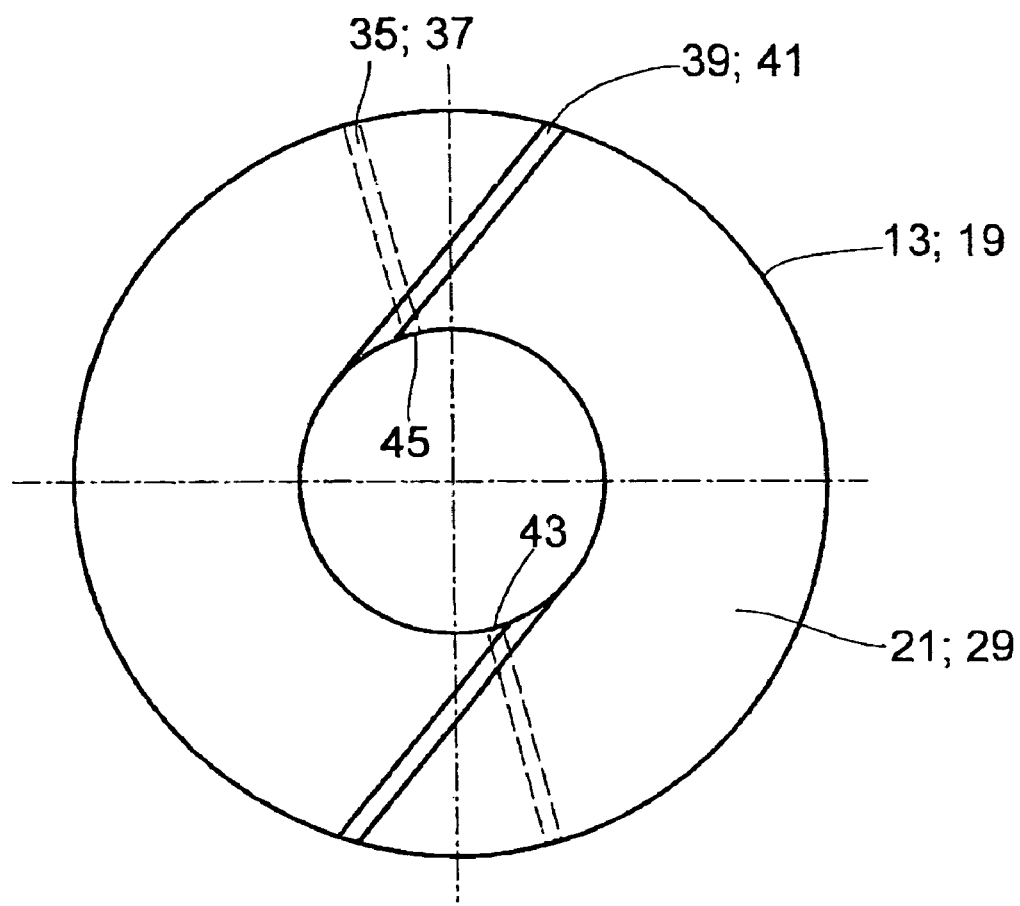
FIG. 5 is a plan view of the support disk in FIG. 2 showing alternative radial channels.

FIG. 5 shows a special design of the radial channels 39, 41 in stop surface 29 or stop surface 21. These channels 39, 41 proceed eccentrically, i.e., in a direction including both radial and circumferential components, from the through-opening for the piston rod to their end points on the outside diameter, which are circumferentially offset from the ends points on the inside diameter. The radial channels 39, 41 intersect the discharge grooves 35, 37 in the stop spring 23, so that, depending on the degree of deformation of the stop spring 23, an additional feed opening 43, 45 leading to the radial channels 39, 41 can be used.

Figure 6:
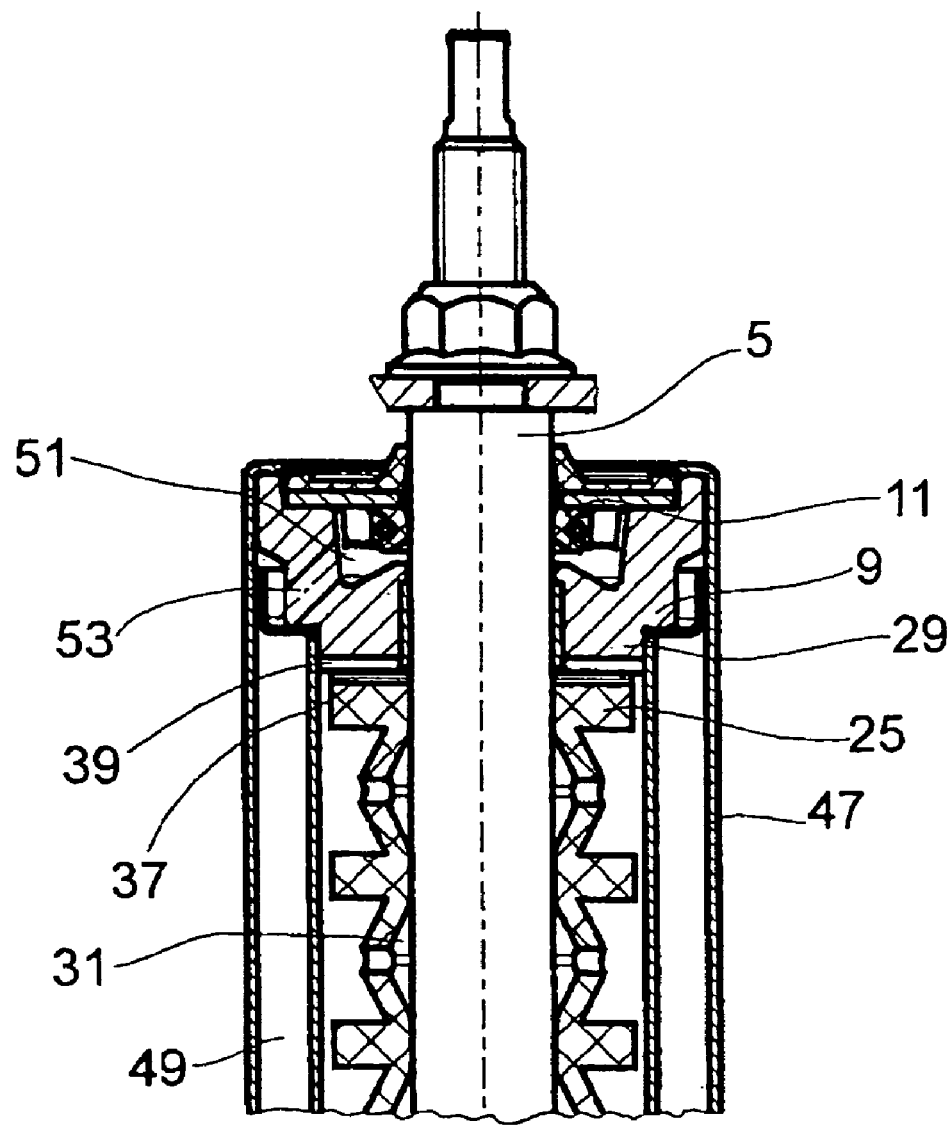
FIG. 6 is a sectional view of a vibration damper of the two-tube type according to another embodiment of the present invention.

FIG. 6 is provided to illustrate that the invention can also be applied usefully to a vibration damper of the two-tube design. The cylinder 1 is surrounded by a container tube 47, and a compensating space 49 is present between the container tube and the cylinder. A stepped opening 51 in the piston rod guide 11 is provided with a leakage oil channel 53, which opens out into the compensating space 49. When the connecting ring 25 of the stop spring 23 rests against the stop surface 29 of the piston rod guide 9, the damping medium can escape from the annular space 31 into the working space 7 without the displacement of damping medium into the stepped opening 51 and the leakage oil channel. As a result, the load on the piston rod seal 11 is considerably reduced.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A vibration damper, comprising:
   a cylinder filled with a damping medium;
   an axially movable piston arranged in said cylinder and connected to a piston rod;
   a stop spring arranged between a first stop surface in a working space of said cylinder and a second stop surface forming an axial boundary of the working space, said stop spring being compressed between said first and second stop surfaces after the piston rod reaches a defined stroke position, said stop spring defining a radially inner space and a radially outer space in the working space, wherein
   said stop spring has at least one discharge groove in one end thereof, one of said first stop surface and said second stop surface being formed by a rigid body defining a radial channel extending from the radial inner space to the radial outer space when said one end of said stop spring contacts said one of said first and second stop surfaces, and said discharge groove in said stop spring and said radial channel in said one of said first stop surface and said second stop surface overlap at least over a portion of their length in the installed position of the stop spring.

2. The vibration damper of claim 1, further comprising a piston rod guide at one end of said cylinder through which said piston rod sealingly extends, said piston rod guide forms a boundary of the working space and comprises a support disk facing the working space and on which said radial channel is formed.

3. The vibration damper of claim 2, wherein the radial channel is produced by a stamping process.

4. The vibration damper of claim 1, wherein said radial channel extends radially outward from the inside diameter of said stop surface in a direction having radial and circumferential components.

* * * * *

UNITED STATES PATENT AND TRADEMARK OFFICE
CERTIFICATE OF CORRECTION

PATENT NO.       : 8,109,491 B2
APPLICATION NO.  : 11/639924
DATED            : February 7, 2012
INVENTOR(S)      : Günther Handke It is certified that error appears in the above-identified patent and that said Letters Patent is hereby corrected as shown below:

Title Page, Item (73) Assignee, should read --ZF Friedrichshafen AG, Friedrichshafen (DE)--

Signed and Sealed this
Twenty-ninth Day of May, 2012

David J. Kappos
*Director of the United States Patent and Trademark Office*